Patented June 2, 1925.

1,540,509

UNITED STATES PATENT OFFICE.

RICHARD C. WILLIAMS, OF BALTIMORE, MARYLAND.

PROCESS OF MANUFACTURING HEAT-INSULATING BRICK.

No Drawing. Original application filed July 2, 1923, Serial No. 649,160. Divided and this application filed February 7, 1925. Serial No. 7,706.

*To all whom it may concern:*

Be it known that I, RICHARD C. WILLIAMS, a citizen of the United States, residing at Baltimore city, State of Maryland, have invented certain new and useful Improvements in Processes for Manufacturing Heat-Insulating Brick, of which the following is a specification.

This invention relates to a process of manufacturing heat insulating brick, this application being a division of my prior application filed by me for a composition of matter for making insulating bricks on July 2, 1923, and bearing the serial number 649,160.

In the manufacture of heat insulating bricks one of the materials found best for this purpose is diatomaceous earth. Such material consists almost entirely of the silicious skeletons or frames of certain minute plants belonging to the confervoid algæ. These skeletal frames occur in large geologic deposits in a practically pure state and, being of nearly pure silica, are of very refractory character. The material is extremely light and porous as it consists of innumerable tubes having thin partitions and extremely thin walls, flat wheels filled with microscopic pores and other specific forms all of which are filled with a multiplicity of minute pores or cells.

The properties essential in ideal material for heat and sound insulating bricks and the like products are that the finished product made from such material shall be of low specific gravity without having large pores; the material must have a high melting point; the material must, for commercial reasons, be cheap and plentiful; it must lend itself to economical manufacturing into the required articles; it must be non-inflammable even at high temperatures; it must possess requisite tensile and compressive strength; and it must be plastic.

Diatomaceous earth is possessed of all these qualities in a high degree except the last two and by a proper process of manufacture the extremely fragile character of the diatoms may be inhibited from exercising injurious effects and, although pure diatomaceous earth is not in itself plastic, yet the diatoms may be easily reduced to such minute particles as to enter readily into the colloidal or semi-colloidal state on which plasticity so largely depends. In fact, in the manufacturing processes employed in brick making, such as pugging, the diatoms are so readily reduced to the colloidal state as to make the mass very difficult, if not impossible to handle in many of the customary subsequent machine operations. Moreover, crushing of the diatoms destroys the pores and the colloidal or semi-colloidal fragments fill up the spaces between the larger particles or unbroken diatoms, thereby greatly increasing the specific gravity of the product and thus decreasing its effectiveness as a heat insulating medium since it is a well established fact that those substances which are resistant to the passage of heat are of low specific gravity and contain innumerable minute spaces.

Many schemes have been tried to take full advantage of the remarkable porosity of this material, and to conquer the inherent difficulties in manufacturing it into useful articles. Some have added various mineral cementing materials or materials that unite with the silica to form a cement, which not only increased the specific gravity, but also lowered greatly the fusion temperature. This renders their product expensive, less resistant to the passage of heat, and lowers the fusion point to a point lower than it is called upon oftentimes to withstand in practice. Others add a percentage of clay or finely ground (colloidal or semi-colloidal) diatoms to give the mass the necessary plasticity for manufacturing into various articles. Naturally this increases the specific gravity, and hence lowers the insulating value of the article. To compensate for the increased specific gravity some add finely divided combustible material, such as cork, sawdust and so forth, to make artificial pores. Naturally a fusion is necessary, and to avoid the requisite high temperature a flux is added, which has the disadvantage of forming comparatively large pores in which, as before noted, radiant heat passes through readily and convection plays a large part. Also the melting point is lowered beyond the point they are oftentimes called upon to withstand in practice.

Consider a box of matches. Suppose they were dumped out of the box, dropped in a pile and stirred so that the matches would lie in every direction. Manifestly they would occupy many times the volume they originally occupied in the box where they are orderly arranged in one direction. Also it is evident that in between the matches there are numbers of air spaces. Now it is also evident that if up to, perhaps, forty per cent of the matches should be broken into very fine particles and stirred into the mass, that the volume is diminished by substantially this per cent, as the very fine particles fill the spaces in between the whole matches. In other words, you increase the specific gravity of the mass by substantially this percentage.

Consider the pile of matches again. If we should apply a heavy pressure (such as is commonly employed in brick-making) every match in it would be crushed. If, however, we had filled up all the spaces in between the match sticks completely with some incompressible material, naturally very heavy pressure would not injure the match sticks. The same thing applies with equal force to the tubes, round flat discs and other forms of diatoms. If these diatoms were loosely (that is, each diatom pointing in a different direction) placed unbroken and then the whole mass consolidated, this would form the lightest and, hence, the most resistant material to the passage of heat that could be made out of this material. Moreover, if each diatom was tied to the adjoining diatoms, even though loosely, this would make the strongest possible article that could be made considering the weight. This is precisely what my invention aims at and actually accomplishes in practice. For by the addition of carbonaceous, viscous, sticky material, each diatom is covered by a film of sticky material which has a cushioning effect, and protects it from fracture in preliminary treatment (pugging and so forth) before it is put under heavy pressure to form the final brick. Here the spaces or voids in between the diatoms are partially filled with sticky, carbonaceous material, and the remaining spaces and pores are completely filled with water. This can not be done with water alone, for the percentage of water necessary to thoroughly protect the diatoms would leave the product so extremely soft that it would not hold its shape. Also the carbonaceous material gives to the mass the necessary plasticity and tenacity for shaping into brick and other articles without the addition of any colloids of another composition or by grinding a percentage of the diatomaceous earth itself into colloids. Moreover, it has been found that in practice the green brick is considerably stronger with the carbonaceous material than without it, and much facilitates the manufacturing of them, and reduces the loss in burning. Also, in the drying process, at which time the water is removed, the shrinkage of the mass is considerably lessened by the addition of carbonaceous, sticky material, for it prevents the slipping of the diatoms freely over each other. Moreover, in the burning process, as there is a defficiency of oxygen in the kiln at first, burning of the carbonaceous material takes place slowly, and a coke is formed which holds the diatoms firmly in place until the sintering temperature is nearly reached, when the coke catches fire and rapidly raises the whole mass in all parts of the kiln to the sintering temperature. Without the carbonaceous material, not only must the temperature be raised considerably higher in some parts of the kiln, but also the outside of each individual brick must be raised considerably higher than the inside initially. This is of considerable practical importance, and much facilitates the manufacture of the brick.

Naturally the more closely packed the diatoms are, the stronger the brick will be. This will, of course, diminish the insulating value of the brick. But under certain conditions this may be desirable. By lessening the percentage of gummy material this can be accomplished. It has been found in practice for most uses that the proper percentage is twenty-five per cent gummy or sticky carbonaceous material, twenty-five per cent water, and fifty per cent diatomaceous earth.

In carrying out my process I employ as a typical composition,

Diatomaceous earth, 50% by weight; carbonaceous binder, 25% by weight; water, 25% by weight.

The carbonaceous binder is in the form of such gummy or sticky material as molasses, gums, tars or other material of this character which will coke before ignition. These ingredients are thoroughly mixed in such manner that the diatoms are not comminuted and reduced to colloidal proportions. The mass is then shaped in suitable molds to the required size and form of the bricks. These formed brick are then exposed to heat in a suitable kiln. As the bricks are heated, the volatile matters are first evaporated or distilled off and then the binder cokes and temporarily secures the individual diatoms in their positions in the mass. This coked binder, upon the heat in the kiln being kept up, now ignites and burns entirely out and, since there is a deficiency of oxygen in the kiln in the usual operation of such devices, the combustion is slow and the diatoms are not disturbed. This combustion of the coked binder greatly increases the heat in the brick and finally raises the temperature to such a degree that sintering of the diatoms and their adhesion to each other is effected. Thus, when the process is completed, the resultant product is a brick consisting entirely (except for negligible impurities) or diatoms in their natural uncomminuted state and sintered together.

Such bricks are extremely light, the standard 2½x4½x9" brick weighing but one and three quarter pounds, and due to the absence of comminuted diatoms, are highly sound and heat resistant.

Having thus described the invention, what is claimed as new, is:

1. That method of manufacturing heat insulating refractory bricks and the like which consists in mixing together diatomaceous earth, a combustible coking binder and water, the quantity of diatomaceous earth being at least equal to the combined quantities of binder and water, molding the mixture, and exposing the molded mixture to a heat sufficient to primarily drive off the volatile matter, next to coke the binder and finally to burn out the binder and effect sintering of the silica.

2. That method of manufacturing heat insulating refractory bricks and the like which consists of mixing together diatomaceous earth, a carbonaceous coking binder and water in the proportions of 50 per cent diatomaceous earth, 25 per cent binder, and 25 per cent of water, molding the mass and exposing the molded mass to heat sufficient to primarily drive off the volatile matter, then coke the binder and finally to burn out the binder and sinter the earth whereby to produce a finished article consisting entirely of particles of diatomaceous earth sintered together.

In testimony whereof I affix my signature.

RICHARD C. WILLIAMS.